US009836399B2

(12) United States Patent
Vinod et al.

(10) Patent No.: US 9,836,399 B2
(45) Date of Patent: Dec. 5, 2017

(54) MECHANISM TO AVOID HOT-L1/COLD-L2 EVENTS IN AN INCLUSIVE L2 CACHE USING L1 PRESENCE BITS FOR VICTIM SELECTION BIAS

(71) Applicant: Intel Corporation, Santa Clara, CA (US)

(72) Inventors: Krishna N. Vinod, San Jose, CA (US); Avinash Sodani, Portland, OR (US); Zainulabedin Aurangabadwala, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 14/671,411

(22) Filed: Mar. 27, 2015

(65) Prior Publication Data

US 2016/0283380 A1 Sep. 29, 2016

(51) Int. Cl.

| | |
|---|---|
| ***G06F 12/12*** | (2016.01) |
| ***G06F 12/0831*** | (2016.01) |
| ***G06F 12/0811*** | (2016.01) |
| ***G06F 12/123*** | (2016.01) |
| *G06F 12/0804* | (2016.01) |

(52) U.S. Cl.
CPC ...... *G06F 12/0833* (2013.01); *G06F 12/0811* (2013.01); *G06F 12/123* (2013.01); *G06F 12/0804* (2013.01); *G06F 2212/1008* (2013.01)

(58) Field of Classification Search
CPC .......................... G06F 12/0833; G06F 12/123
USPC .......................................................... 711/135
See application file for complete search history.

(56) References Cited

U.S. PATENT DOCUMENTS

2007/0186045 A1* 8/2007 Shannon .............. G06F 12/128
711/133

* cited by examiner

*Primary Examiner* — Jae Yu
(74) *Attorney, Agent, or Firm* — Lowenstein Sandler LLP

(57) ABSTRACT

A processor includes a processing core, an L1 cache, operatively coupled to the processing core, the L1 cache comprising an L1 cache entry to store a data item, an L2 cache, inclusive with respect to the L1 cache, the L2 cache comprising an L2 cache entry corresponding to the L1 cache entry, an activity flag associated with the L2 cache entry, the activity flag indicating an activity status of the L1 cache entry, and a cache controller to, in response to detecting an access operation with respect to the L1 cache entry, set the flag to an active status.

17 Claims, 14 Drawing Sheets

| P-bit For L1 Cache Entry 1 in 110A | 1 | P-bit For L1 Cache Entry 1 in 110B | 0 |
|---|---|---|---|
| P-bit For L1 Cache Entry 2 in 110A | 0 | P-bit For L1 Cache Entry 2 in 110B | 1 |
| ... | ... | ... | ... |
| P-bit For L1 Cache Entry n in 110A | 0 | P-bit For L1 Cache Entry n in 110B | 1 |

200

202 → (left column)

204 → (right column)

| Pbit 304A | L2 Cache Entry 302A |
|---|---|
| Pbit 304B | L2 Cache Entry 302B |
| ... | ... |
| Pbit 304N | L2 Cache Entry 302N |

300

400

430

MECHANISM TO AVOID HOT-L1/COLD-L2 EVENTS IN AN INCLUSIVE L2 CACHE USING L1 PRESENCE BITS FOR VICTIM SELECTION BIAS

TECHNICAL FIELD

The embodiments of the disclosure relate generally to cache management and, more specifically, to preventing the occurrence of hot L1 cache/cold L2 cache events in an inclusive L2 cache using L1 activity flags to select victim L2 cache entries.

BACKGROUND

A processor may include one or more processing cores, caches, and cache controllers. The cache controllers are circuit logics used to manage caches for read and write operations directed to a main memory. Caches may include different types of caches including L1, L2, and L3 caches. An L1 cache is a cache associated with a specific processing core. An L2 cache may be shared by several cores in a multicore processor. Further, multiple processors may share a common L3 cache. Each cache may include one or more cache entries to store local copies of data stored in the main memory and the addresses of the data stored in the main memory. The cache controllers of the processor may manage operations on L1, L2, and L3 caches according to a cache coherence protocol. The cache coherence protocol is a set of rules that ensures consistency of data stored in multiple caches and the main memory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
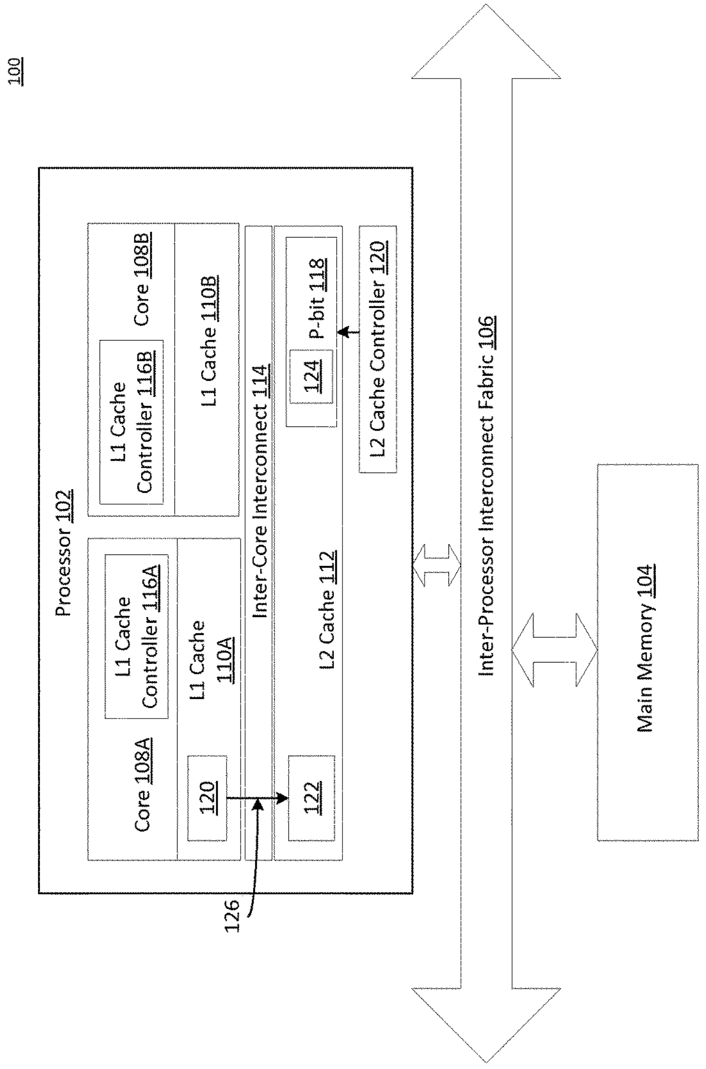
FIG. 1 illustrates a system-on-a-chip (SoC) including processing cores according to an embodiment of the present disclosure.

Cache is commonly used to increase the speed of memory read and write operations. When a processing core of a processor needs to read a data item from a location in the main memory, the processing core may first check whether a copy of the data item is stored in the cache system (any of L1-L3 caches). If the processing core determines that the data item is indeed stored in the cache (known as a "cache hit"), the processing core may read the data item from the cache rather than from the memory. The cache is active (or being actively used by the processing core) when there is a cache hit. If the processing core determines that a valid copy of the data item cannot be found in the cache system (known as a "cache miss"), the processing core may read the data item from the main memory.

A cache (e.g., any of the L1-L3 caches) may include one or more cache entries (also known as "cache lines") to store data items to be read from or written to memory locations. Each cache entry may include a data field to store the data item and a tag field to store the location at which the data is stored in the main memory. Each cache entry may also include a flag field to store a set of flags indicating certain status of the cache entry. The data item may have been stored in the cache due to previously executed instructions. The contents (e.g., the data item in the data field and flags in the status field) stored in cache entries of the cache system may change while the processor continuously executes instructions in the instruction pipeline. One or more cache controllers may monitor the instruction executions directed to the main memory and the cache entries of the cache system to ensure that the data items stored in a cache are consistent with data items stored in other caches and the main memory according to a cache coherence protocol. A cache controller may invalidate a cache entry if the cache controller detects modification of a copy of the data item that is stored in other caches and/or the main memory. A cache miss may occur if a processing core attempts to read a data item that is non-existent or is labeled as invalid in a cache entry of the cache system. In some embodiments, the cache controller may include one or more L1 cache controllers for managing the L1 caches and one or more L2 cache controllers for managing the L2 caches in a processor. In one embodiment, the L1 and L2 cache controllers may be implemented on one circuit collectively referred to as a cache controller. In another embodiment, the L1 and L2 cache controllers may be implemented on discrete circuits.

If a cache miss occurs (e.g., the data item to be read by the processor is not found in the cache or is invalid), the processing core may retrieve the data item from the main memory. Further, the processing core may store the previously un-cached data item (retrieved from the main memory) in the cache system as a local copy for future use. In certain situations (e.g., all cache entries are valid), the processing core may need to evict contents stored in a cache entry to make room for the data item newly retrieved from the main memory. The processing core commonly selects a cache entry to evict according to certain heuristics (or rules) referred to as a "replacement policy."

A replacement policy may include rules to select one or more cache entries for eviction. The selected and evicted cache entries are known as victim cache entries. The evicted cache entries may be stored in a victim cache, a last level cache (LLC), or the main memory. One type of the replacement policy is the least-recently used (LRU) replacement policy that selects and evicts the least recently accessed cache entry in the cache. Thus, the LRU replacement policy may require tracking the time that each cache entry is used by the processor and evict the cache entry that is the least recently used first. For example, an "age bit" may be associated with each cache entry to indicate how long the cache entry has not been used. The LRU replacement policy may improve the cache hit rate (i.e., the percentage of cache hit among attempts to retrieve data items from the main memory). A high cache hit rate may result in efficient and fast execution of instructions.

The cache system may include a hierarchy of cache levels. The L1 caches are commonly closest to the processing cores in a processor and therefore, have the shortest retrieval time. The L2 caches are commonly shared by multiple processing cores of the processor and have retrieval time longer than L1 caches but shorter than L3 caches that are shared by processors. The size of an L1 cache is typically smaller than the size of an L2 cache which is typically smaller than that of an L3 cache. Larger caches may have a higher hit rate. Thus, there is a tradeoff between the cache hit rate and the cache latency when choosing which cache to store a data item retrieved from the main memory.

In some implementations, a data item may be stored in both the L1 cache and L2 cache associated with a processing core. For example, in certain type of processors, the contents of an L1 cache associated with a processing core is also stored somewhere in an L2 cache associated with the same processing core. Thus, the L2 cache is inclusive of the contents of the L1 cache. In the event that an L2 cache entry of an inclusive L2 cache is evicted, the L1 cache entry inclusively related to the evicted L2 cache entry also needs to be evicted even if the L1 cache entry is valid.

A replacement policy (e.g., the LRU replacement policy) is commonly used to determine the evicted cache entry (referred to as a "victim" hereinafter) in the L2 cache. It is, however, possible to have an L2 cache entry determined to be the LRU cache entry in the L2 cache, but the corresponding L1 cache entry in the L1 cache is actively used by the processing core due executing a read operation. This may occur before the contents of the L1 cache entry are written back to the inclusive L2 cache. Under this scenario, the LRU replacement policy of the L2 cache may select the seemingly ideal L2 cache entry as a victim to evict. But the eviction of the selected L2 cache entry results in the eviction of the corresponding L1 cache entry that is being actively used by the processing core. In response to detecting the eviction of the still active L1 cache entry, the processing core needs to repopulate the L1 and L2 cache entries with the same date item. This is commonly known as a hot-L1/cold-L2 event that leads to cache entry thrashing and waste of computation resources. Therefore, there is a need for a mechanism to reduce occurrences of hot-L1/cold-L2 events.

In some implementations, a processing core may send LRU hints from L1 cache to L2 cache via an execution pipeline (e.g., via the interconnect between the L1 cache and the L2 cache). A hint is a micro instruction that is executed periodically to update the L2 cache entries with activities from the L1 cache. Because these hints are passed from the L1 cache to the L2 cache via execution pipeline each time an L1 cache entry is accessed by the processing core, the transmission of these hints may clog up the pipeline and adversely affect the processor performance. Thus, the frequency to transmit hints between L1 and L2 caches requires tuning. Due to variable workload at various processing cores, however, it is difficult to achieve a level of hint transmission frequency that works universally for all workloads.

Instead of transmitting hints from L1 cache to L2 cache via the execution pipeline, embodiments of the present disclosure provide for a block of L1 activity flags to store L1 activity status for L2 cache entries. In one embodiment, each of L1 activity flags may be represented by a presence bit (referred to as "pbits" hereinafter). Each pbit may be associated with one L2 cache entry to provide an activity status of the corresponding L1 cache entry stored in the L1 cache. In one embodiment, the processing core may instruct the cache controller (e.g., the L2 cache controller) to set the pbit for an L2 cache entry if the cache controller determines that the corresponding L1 cache entry is in an active status. Further, in response to an eviction event at the L1 cache entry, the cache controller (e.g., the L1 cache controller via a direct communication channel or the L2 cache controller) may clear the pbit for the L2 cache entry to an inactive status if the L1 cache controller determines that the corresponding L1 cache entry is unused or invalid (i.e., the data item is stored in the L2 cache entry only). When to select a L2 victim to evict, the block of pbits may be used as an address-mask to exclude any L2 cache entries whose pbit is set to the active status. The address-mask may show the address (e.g., in terms of set/way numbers in the L2 cache) of an L2 cache entry associated with a pbit showing active status. A replacement policy (e.g., the LRU replacement policy) may be applied to the rest of L2 cache entries, thus eliminating or reducing the occurrence of Hot-L1/Cold-L2 events.

FIG. 1 illustrates a system-on-a-chip (SoC) 100 including processing cores according to an embodiment of the present disclosure. The SoC 100 may include a processor 102, a main memory 104, and an inter-processor fabric 106. Processor 102 may further include one or more processing cores 108A, 108B. Each of the processing cores 108A-108B may be associated with a dedicated L1 cache 110A-110B dedicated to the corresponding processing core. For example, as shown in FIG. 1, the processing core 108A is associated with L1 cache 110A, and the processing core 108B is associated with L1 cache 110B. The processing cores 108A-108B may respectively include a L1 cache controller 116A, 116B correspondingly managing the L1 cache entries in L1 cache 110A, 110B according to a cache coherence protocol.

Further, processing cores 108A-108B may be associated with an L2 cache 112 and an L2 cache controller 120 for managing L2 cache entries of the L2 cache 112. The L2 cache controller 120 may communicate with L1 cache controllers 116A, 116B and processing cores 108A, 108B via an inter-core interconnect fabric 114. In one embodiment, L2 cache 112 is an inclusive L2 cache in the sense that a data item stored in L1 caches 108A, 108B is also stored in L2 cache 112. Thus, a data item stored in the L1 cache entry 120 is also stored in the L2 cache entry 122.

In one embodiment, each of the cache controllers 116A, 116B, 120 of processor 102 may manage cache entries in L1 and L2 caches according to certain cache coherence protocol (e.g., the MESI protocol). Cache controllers 116A, 116B, 120 may monitor the read/write operations issued by processing cores 108A, 108B and update the status of cache entries in L1 caches 110A, 110B and L2 cache 112.

In one embodiment, processor 102 may further include a block of pbits 118. Each pbit may be associated with an L2 cache entry to indicate whether the corresponding L1 cache entry is active. In one embodiment, the block of pbits may be part of the L2 cache 112. For example, each L2 cache entry may include a pbit (e.g., in the status field) to indicate the activity status of the corresponding L1 cache entry. In another embodiment, the block of pbits 118 may be stored in a dedicated portion of the L2 cache. In yet another embodiment, the block of pbits may be stored in a register operatively coupled to the L2 cache controller 120.

In one embodiment, because L2 cache 112 is inclusive of L1 caches 116A, 116B, each L1 cache entry in L1 caches may include the address of the L2 cache entry correspondingly storing a copy of the data item of the L1 cache entry. For example, each L1 cache entry may include the set and way of the corresponding inclusive L2 cache entry in the L2 cache 120. In one embodiment, processor 102 may include one-way communication channels (referred to as a "sideband" hereinafter) 126 from the L1 cache entry (e.g., 120) to the corresponding L2 cache entry (e.g., 122). In one embodiment, the sideband dedicate is a one-way communication channel from L1 cache controller to L2 cache controller with the purpose of clearing pBits in L2 without using L2 cache controller resources normally consumed by all other L1 to L2 communications that occur via a request interface between the L1 cache controller and the L2 cache controller. Through sideband 126, an L1 controller (e.g., 116A) may asynchronously clear the pbit associated with the correspondingly L2 cache entry directly based on the address of the L2 cache entry stored in the L1 cache entry. In this way, the pbits can be set or cleared without the need to consume resources in the L2 cache controller 120.

Figure 2:
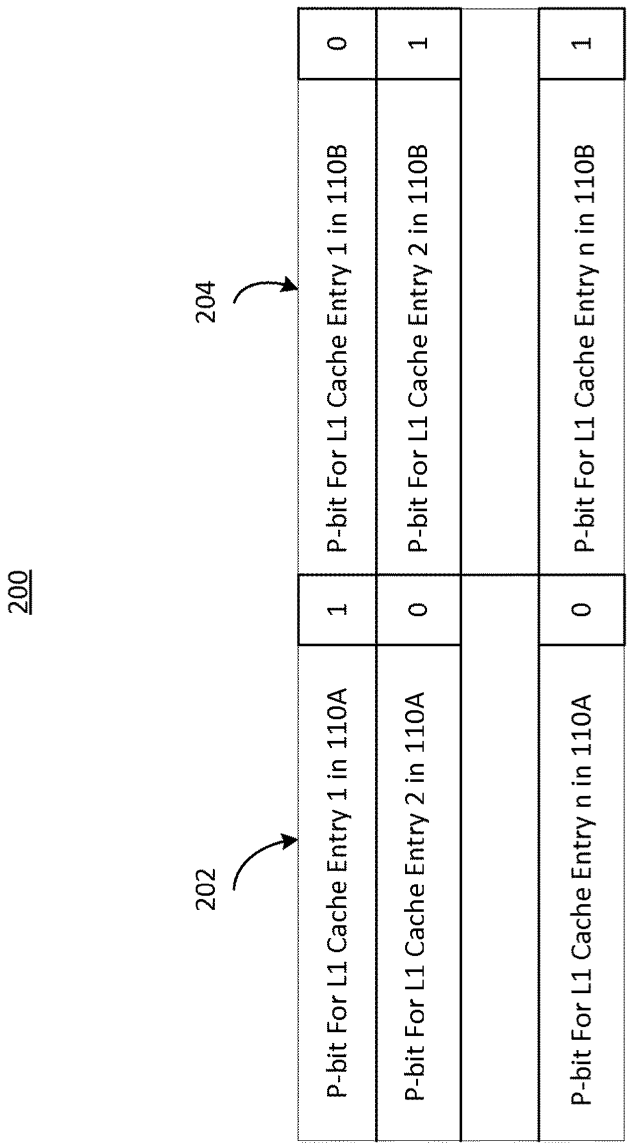
FIG. 2 shows a block of flags stored in a register according to an embodiment of the present disclosure.

FIG. 2 shows a block of flags (pbits) 200 stored in a register according to an embodiment of the present disclosure. The block of pbits may be stored in an L2 cache or a register associated with an L2 cache controller. As shown in FIG. 2, the block of pbits 200 may include a first portion 202 to store the pbits for a first set of L2 cache entries that correspond to L1 cache entries stored in cache 110A and a second portion 204 to store the pbits for L2 cache entries that correspond to L1 cache entries stored in L1 cache 110B. A pbit may be set to "1" to indicating an active status, and to "0" to indicate an inactive status. Each pbit is a flag that may be set by L1 cache controllers 116A, 116B in response to detecting an access to the corresponding L1 cache entry and may be cleared by the L1 cache controllers 116A, 116B in response to detecting an invalidation of the corresponding L1 cache entry.

Figure 3:
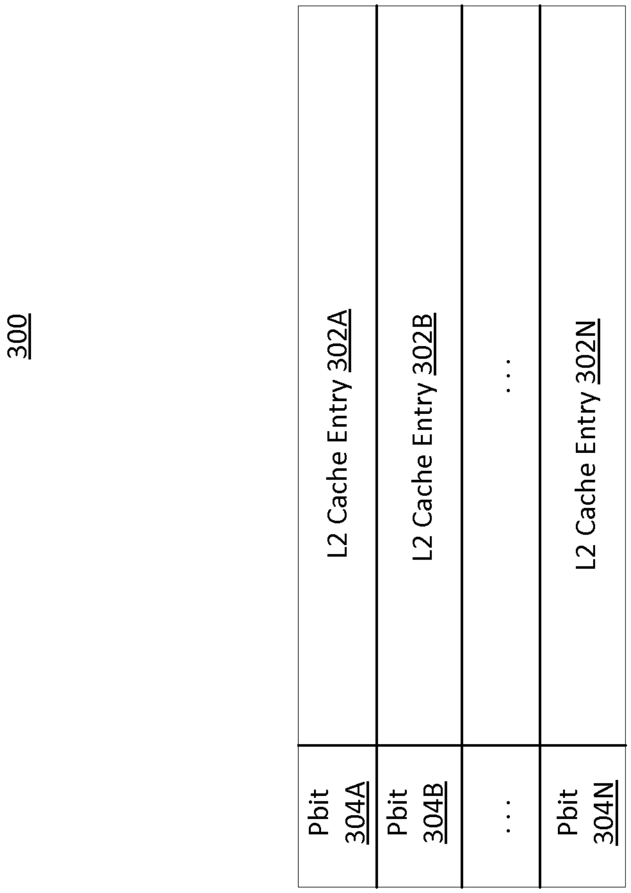
FIG. 3 shows a block of L2 cache entries including flags (pbits) according to an embodiment of the present disclosure.

In another embodiment, each L2 cache entry may include a pbit to indicate the activity status of the corresponding L1 cache entry. FIG. 3 shows a block of L2 cache entries including flags (pbits) according to an embodiment of the present disclosure. As shown in FIG. 3, L2 cache 300 may include one or more L2 cache entries 302A-302N. Because L2 cache 300 is inclusive of L1 cache entries, each of the L2 cache entries 302A-302N may store data items of corresponding L1 cache entries that may or not be active (i.e., there is a cache hit to the L1 cache entry). Further, each of the L2 cache entries 302A-302N includes a respective pbit 304A-304N to indicate the activity statuses of the corresponding L1 cache entries. In one embodiment, each of the pbits 304A-304N are a bit in the flag field of the L2 cache entries 302A-302N and is designated to indicate the activity status of the corresponding L1 cache entry. Thus, in this embodiment, the block of pbits is part of the L2 cache.

Referring to FIG. 1, for example, the pbit 124 may be associated with the L2 cache entry 122. The pbit 124 may be set if L1 cache controller 116A detects an access to L1 cache entry 120, and may be cleared if L1 cache controller 116A detects an invalidation of L1 cache entry 120. Because L1 cache controller 116A monitors the cache activities by snooping on instruction traffics interconnects 106, 114, the need to transmitting hints between L1 caches and L2 cache is eliminated, thus reducing the traffic in the execution pipeline. Snooping is a process that a cache controller employs to monitor the address lines of the main memory 104 for access (read or write) to the memory location that a cache has a local copy. As shown in FIG. 1, the cache controller (e.g., 116A) may monitor activities at the address line of the main memory 104 to detect if there are any read or write operations associated with L1 cache entry 120 and detect access to the L1 cache entry or invalidation of the L1 cache entry according to the cache coherence protocol.

Figure 4A:
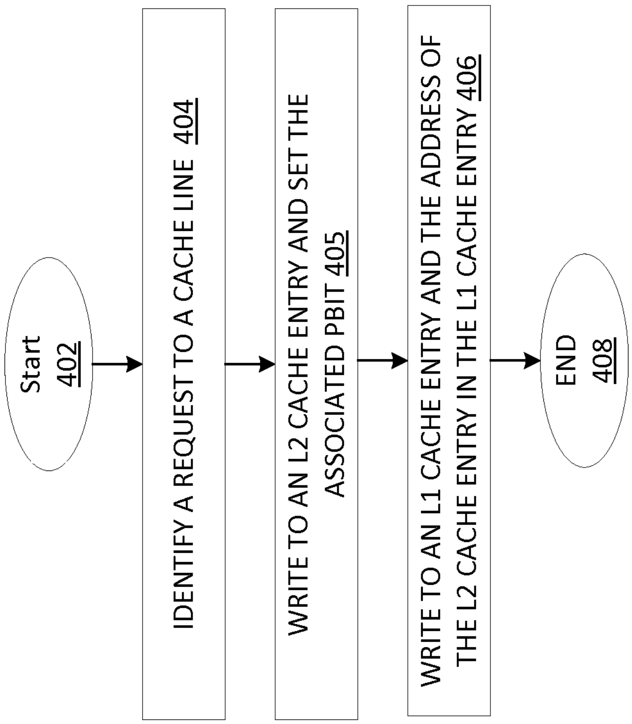
FIG. 4A is a block diagram of a method to set a pbit in an L2 cache entry according to an embodiment of the present disclosure.

FIG. 4A is a block diagram of a method 400 to set a pbit according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of the processor 102 including processing core 104 and cache controllers 106A, 106B, 120 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4A, at 402, the operations start. At 404, the processing core may execute an instruction (e.g., a memory read operation) that requests to fill an L1 cache entry (and thus a corresponding inclusive L2 cache entry) with a data item. In response to executing the instruction, at 405, the L2 cache controller may write the data item (read from the main memory) in the L2 cache entry and set the pbit associated with the L2 cache entry to the active status to indicate that the corresponding L1 cache entry is active. At 406, the L1 cache controller may also write the same data item in the L1 cache entry and the L2 cache address (e.g., in terms of set/way in the L2 cache) of the corresponding inclusive L2 cache entry in the L1 cache entry. The L2 cache address of the corresponding L2 cache entry may be used for later clearing the pbit. The operations for setting the pbit conclude at 408.

Figure 4B:
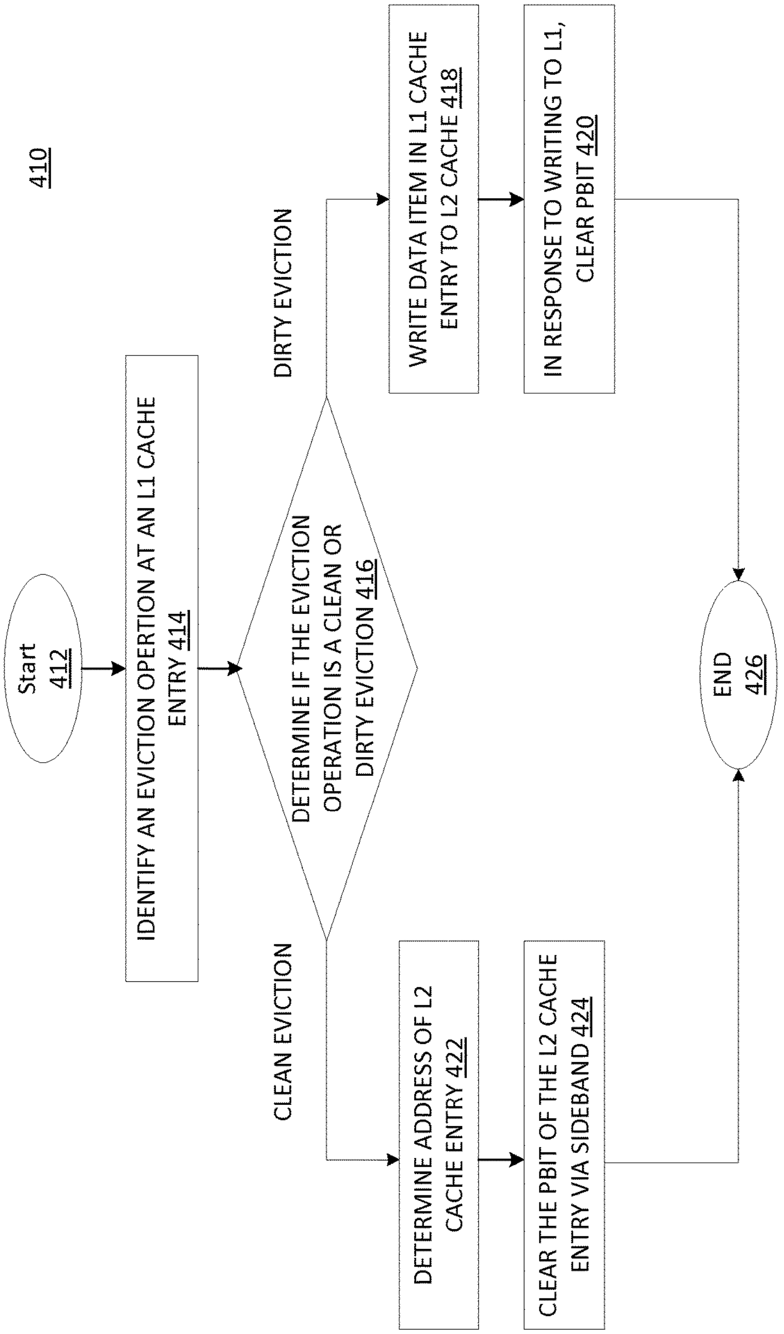
FIG. 4B is a block diagram of a method to clear a pbit in an L2 cache entry according to an embodiment of the present disclosure.

FIG. 4B is a block diagram of a method 410 to clear a pbit in an L2 cache entry according to an embodiment of the present disclosure. Method 410 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 410 may be performed, in part, by processing logics of the processor 102 including processing core 104 and cache controllers 106A, 106B, 120 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 410 could alternatively be represented as a series of interrelated states via a state diagram or events.

Referring to FIG. 4B, the operations may start at 412. At 414, an L1 cache controller may identify an eviction operation directed at an L1 cache entry. The L1 cache entry eviction can be either a "dirty" eviction (i.e., the data item in the L1 cache entry is indicated as modified from other copies in other cache locations or the main memory and being evicted from L1 cache) or a "clean" eviction (i.e., the data item in the L1 cache entry is indicated as "unchanged" and being evicted from L1 cache). At 416, the L1 cache controller may determine whether the L1 cache entry eviction is dirty or clean based on status bits stored in the L1 cache entry. If the eviction is dirty, at 418, the L1 cache controller may inform the processing core to write the data item stored in the L1 cache entry to the corresponding inclusive L2 cache entry. In response to the write operation at the L2 cache entry, the L2 cache controller may clear the pbit to the inactive status to indicate that the corresponding L1 cache entry is inactive.

If the eviction is clean, at 422, the L1 cache controller may determine the address (e.g., the set/way numbers) of the corresponding L2 cache entry in the L2 cache. The address information may already have been stored in the L1 cache entry. Based on the address information, the L1 cache controller may clear the pbit in the L2 cache entry to the inactive status using the one-way communication channel between L1 cache entry and L2 cache entry or the sideband. The clearing is performed without the assistance from the processing core or the L2 cache controller. The operations may end at 426.

Figure 4C:
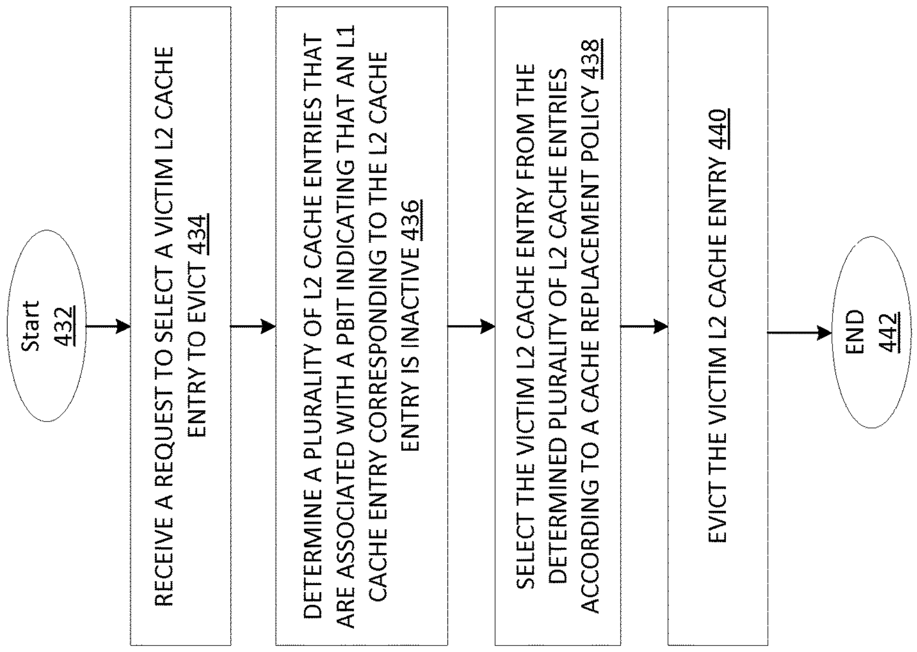
FIG. 4C is a block diagram of a method to determine a victim L2 cache entry using pbits according to an embodiment of the present disclosure.

FIG. 4C is a block diagram of a method 430 to use flags (pbits) to determine a victim L2 cache entry according to an embodiment of the present disclosure. Method 430 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of the processor 102 including processing core 104 as shown in FIG. 1.

For simplicity of explanation, the method 430 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 430 could alternatively be represented as a series of interrelated states via a state diagram or events.

The operations to determine an L2 cache entry victim and evict the victim begin at 432. In response to a request for an L2 cache entry, the processor may first determine whether the L2 cache includes any cache entries that are available for use. An L2 cache entry is available if it is labeled as, for example, invalid. If there is no available L2 cache entry, at 434, a processor may receive a request to select a victim L2 cache entry in an inclusive L2 cache. The request may be generated in response to a write back in from the main memory to the L2 cache and the need to evict an L2 cache entry to make room for a new L2 cache entry. At 436, the processor may retrieve the pbits associated with the L2 cache entries stored in the L2 cache and determine a first set of L2 cache entries that are associated with a pbit indicating an inactive status.

At 438, the processor may select a victim L2 cache entry from the first set of L2 cache entries according to a cache replacement policy of the L2 cache. In one embodiment, the cache replacement policy may be an LRU replacement policy.

At 440, the processor may evict the selected victim L2 cache entry to make room the new L2 cache entry. In the event that the pbit of all of the L2 cache entries indicate an active status, the LRU may be applied to select a victim from all of the L2 cache entries. The operations end at 442.

Embodiments of the present disclosure are discussed in the context of discrete L1 controllers and an L2 controller. It is understood, however, that embodiments of the present disclosure are equally applicable to implementations whereas the L1 cache controllers and the L2 cache controller are implemented as a single cache controller that performs the tasks of both the L1 cache controllers and the L2 cache controller.

Figure 5A:
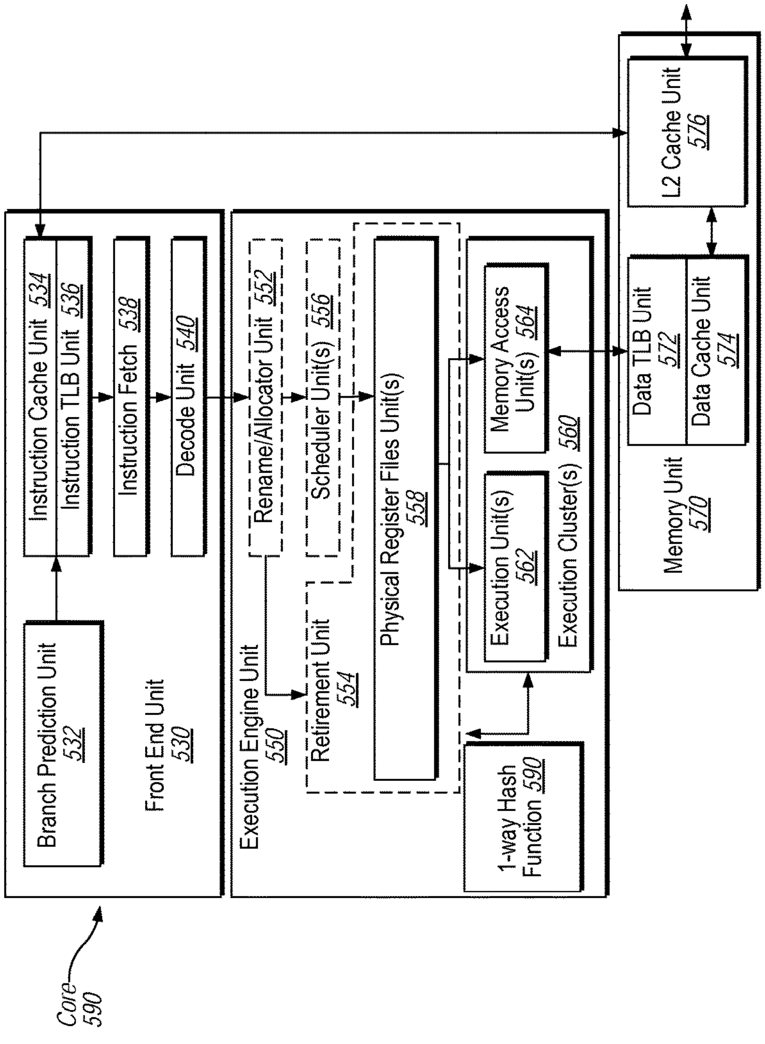
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multicore processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1A.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
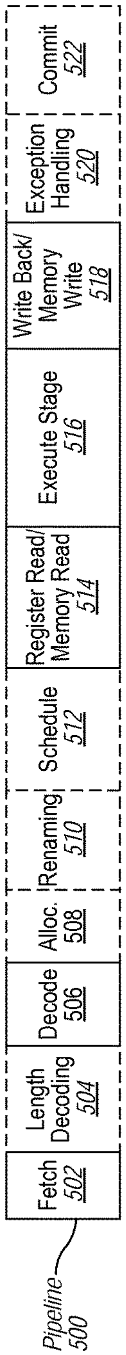
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
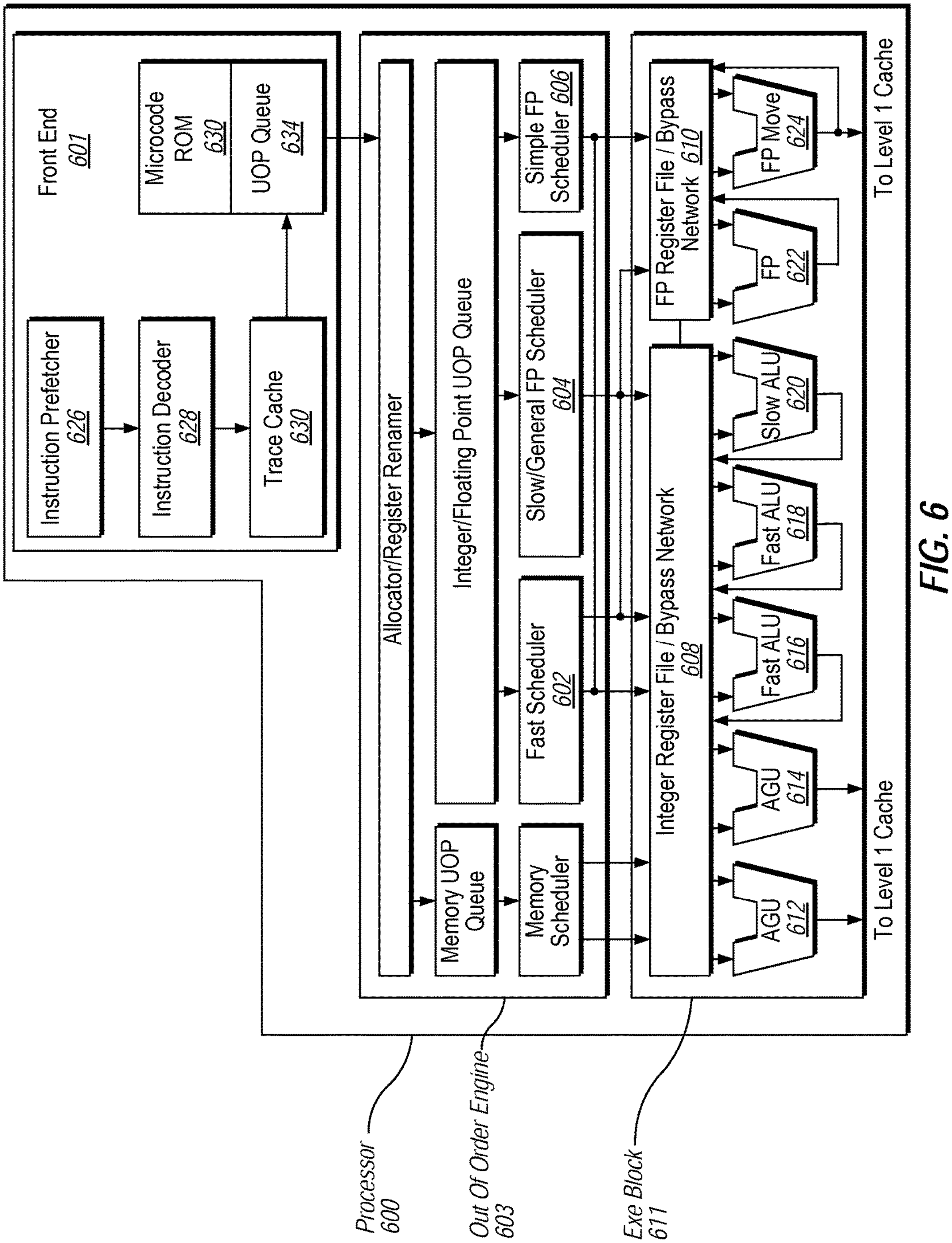
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
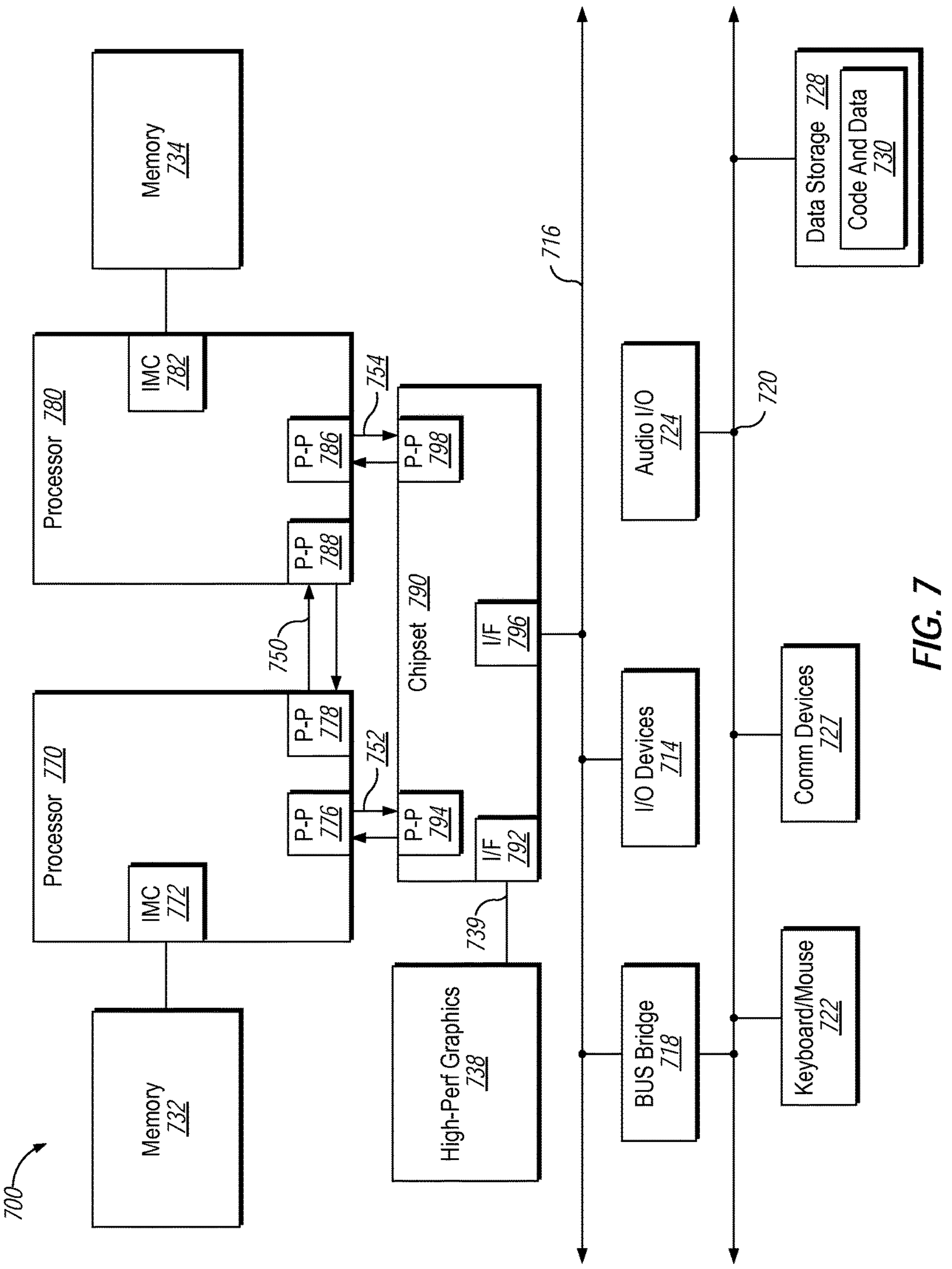
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
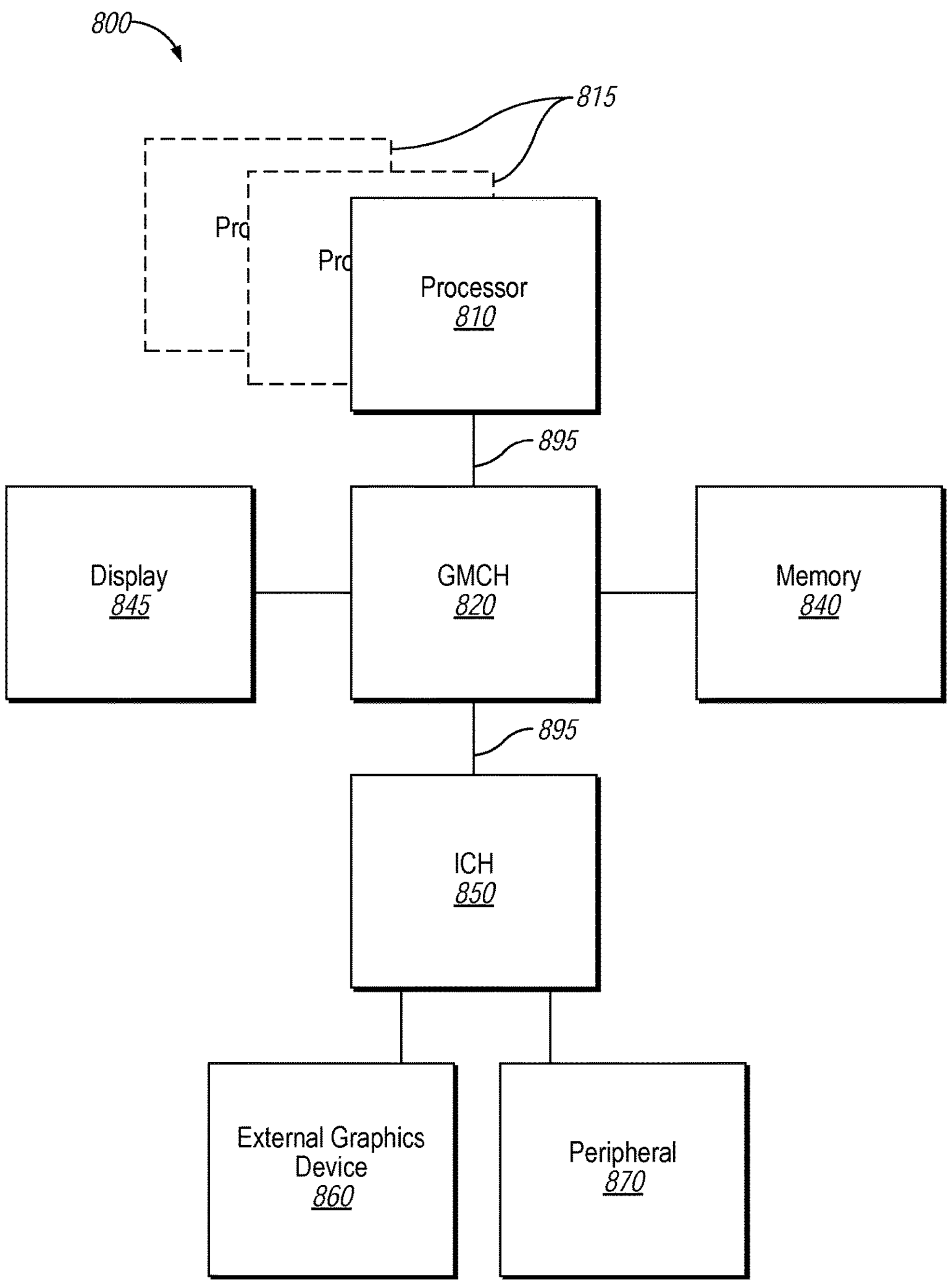
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
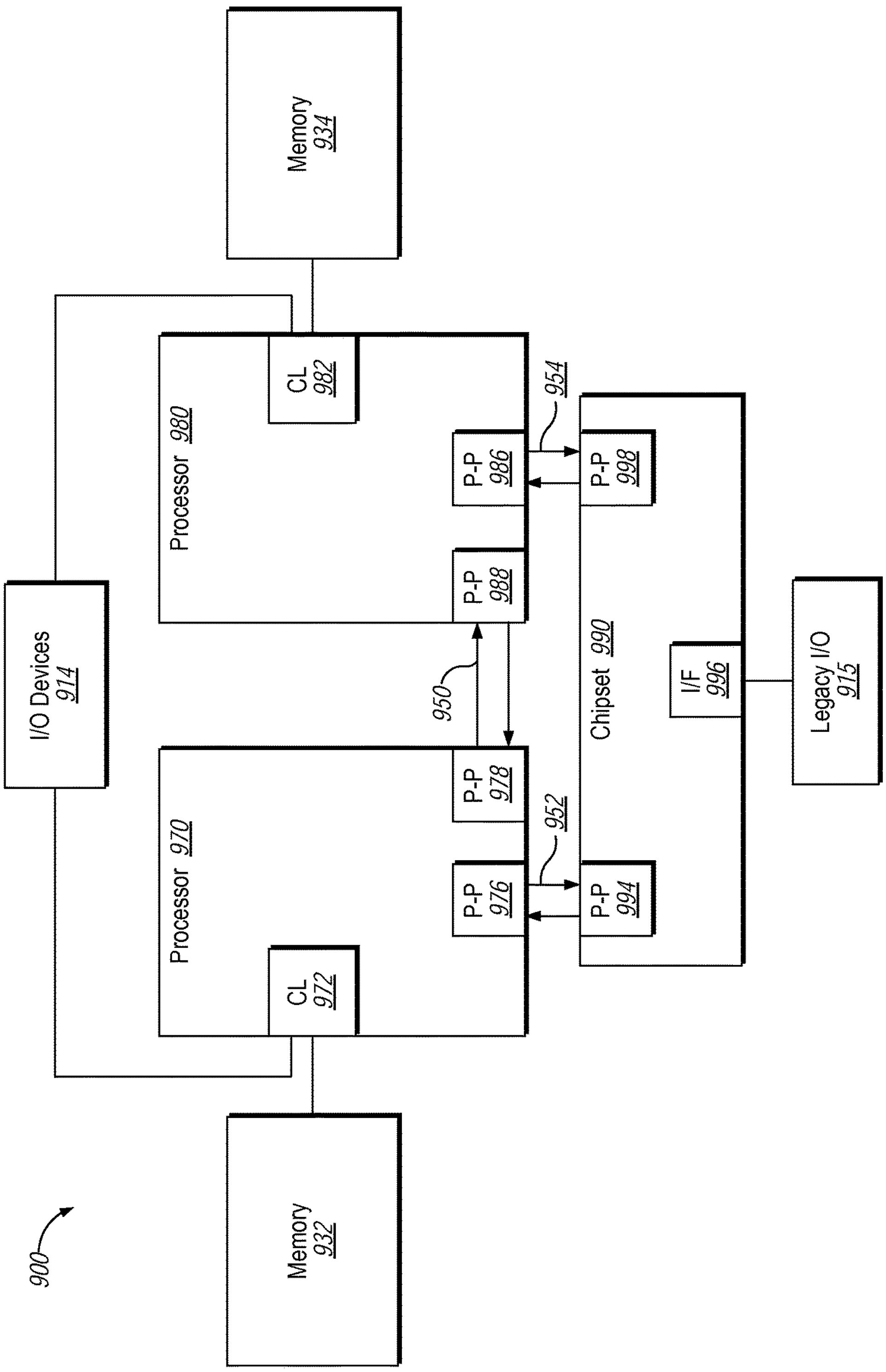
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
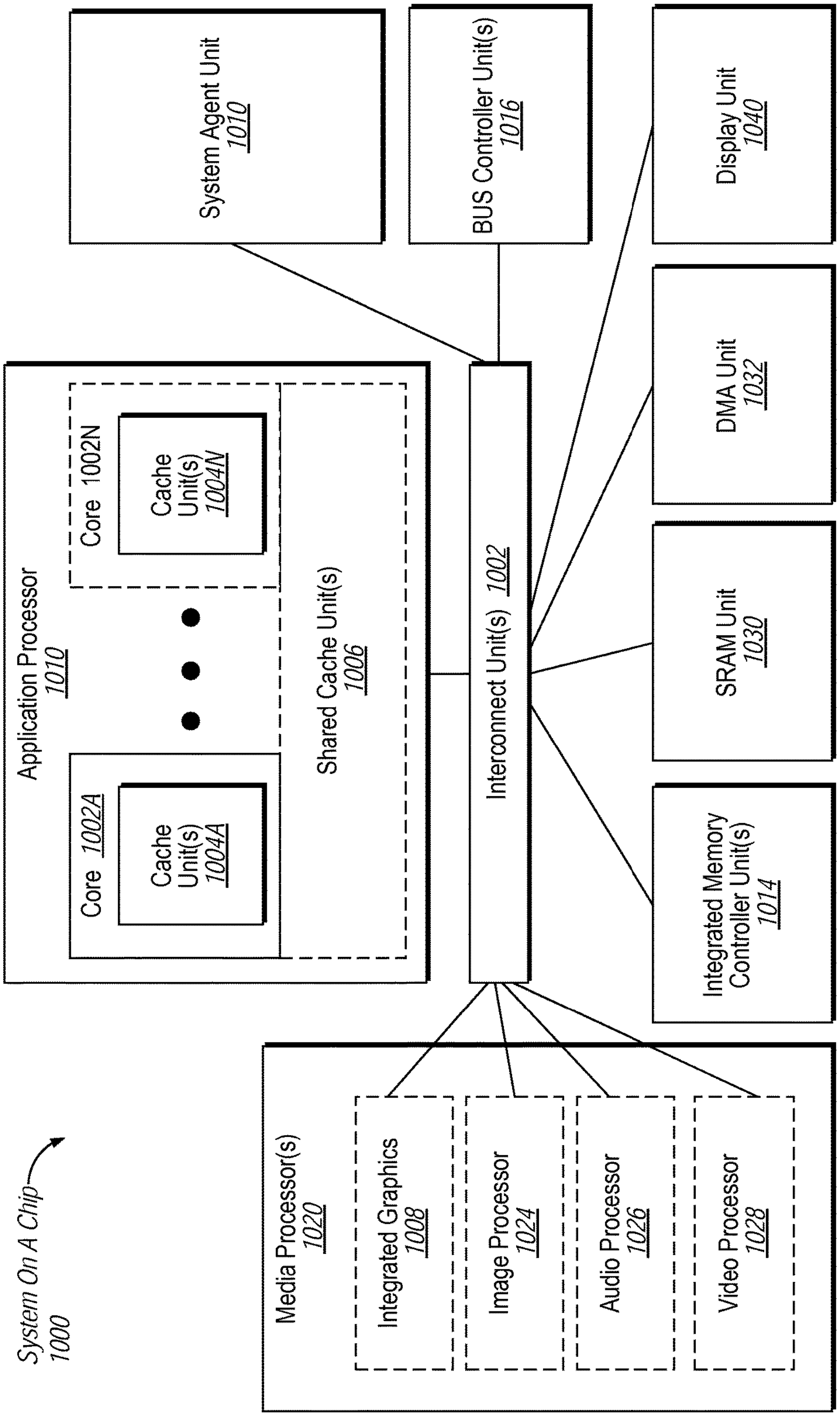
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
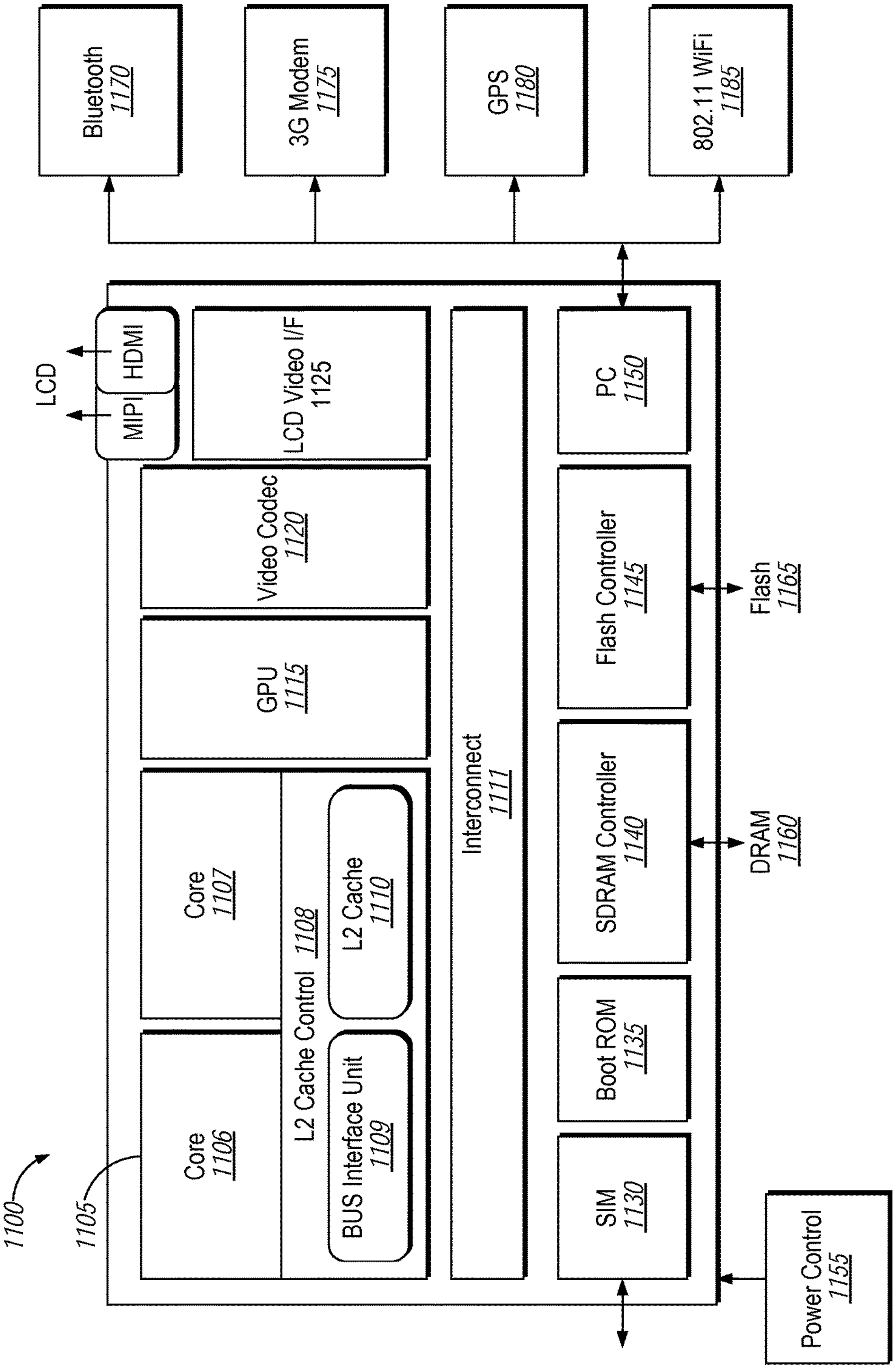
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
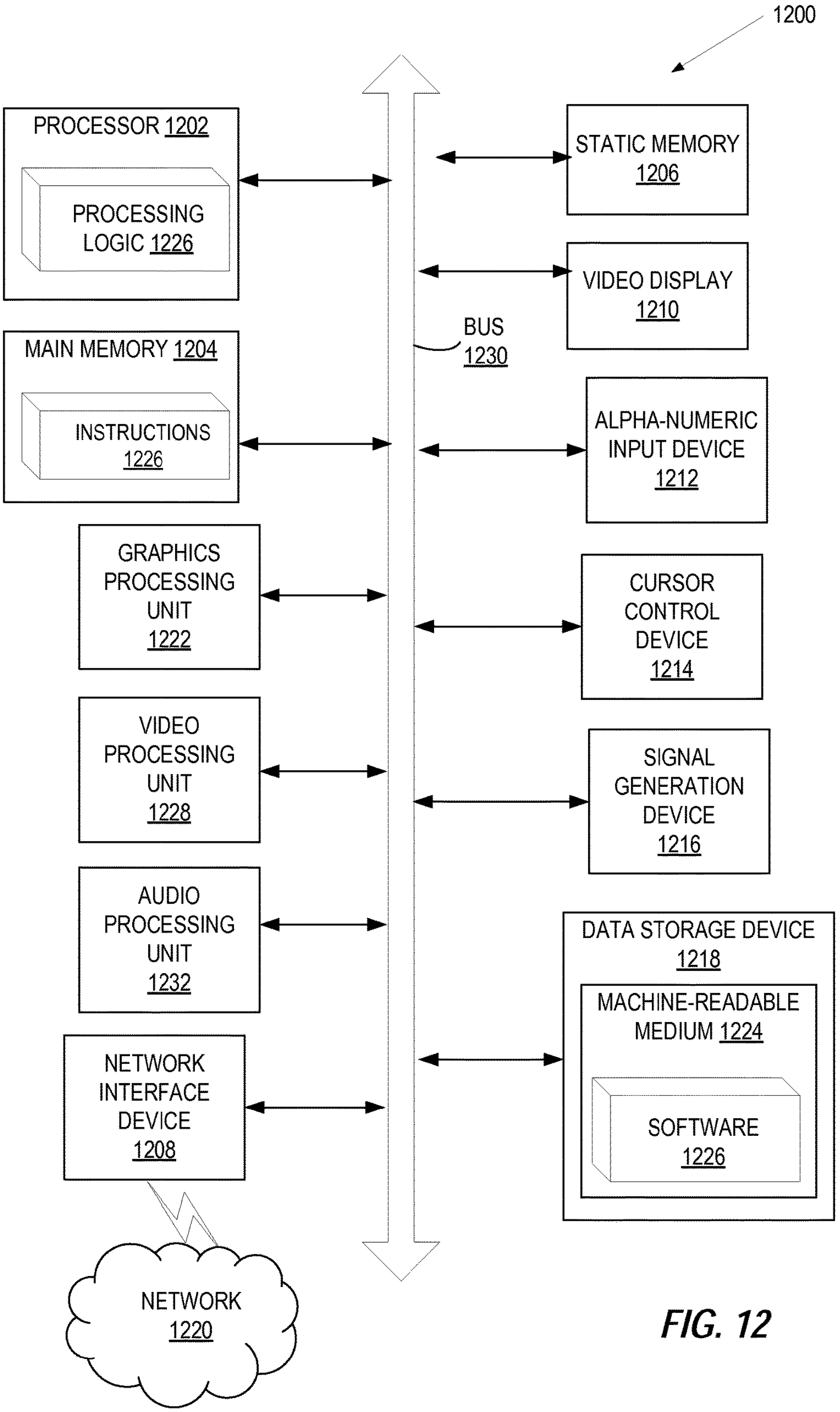
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1A as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including a processing core, an L1 cache, operatively coupled to the processing core, the L1 cache comprising an L1 cache entry to store a data item, an L2 cache, inclusive with respect to the L1 cache, the L2 cache comprising an L2 cache entry corresponding to the L1 cache entry, an activity flag associated with the L2 cache entry, the activity flag indicating an activity status of the L1 cache entry, and a cache controller to, in response to detecting an access operation with respect to the L1 cache entry, set the flag to an active status.

In Example 2, the subject matter of Example 1 can optionally provide that the cache controller is further to, in response to detecting an eviction operation with respect to the L1 cache entry, set the flag to an inactive status.

In Example 3, the subject matter of any of Examples 1 and 2 can optionally provide that in response to detecting the eviction operation, the cache controller, responsive to determining that the data item stored in the L1 cache entry has not been modified, is further to clear the flag to the inactive status via a communication channel from the L1 cache entry to the L2 cache entry.

In Example 4, the subject matter of any of Examples 1 and 2 can optionally provide that the processing core is further to, in response to receiving a request to select for eviction a victim L2 cache entry, identify a plurality of L2 cache entries associated with activity flags indicating the inactive status, and select, in accordance with a cache replacement policy, the victim L2 cache entry from the plurality of L2 cache entries.

In Example 5, the subject matter of Example 3 can optionally provide that the processing core is further to evict the victim L2 cache entry.

In Example 6, the subject matter of Example 3 can optionally provide that the replacement policy is a least-recently used (LRU) replacement policy.

In Example 7, the subject matter of Example 1 can optionally provide that the L2 cache entry of the L2 cache stores the data item stored in the L1 cache entry of the L1 cache.

In Example 8, the subject matter of Example 1 can further comprise a register, operatively coupled to the cache controller, to store a value of the flag.

In Example 9, the subject matter of any of Examples 1 and 7 can optionally provide that the register comprises a plurality of bits to store values of a plurality of flags associated with a plurality of L2 cache entries in the L2 cache.

In Example 10, the subject matter of Example 1 can optionally provide that the L2 cache entry comprises a flag field to store a value of the flag.

Example 11 is a system-on-a-chip (SoC) including a processing core, an L1 cache, operatively coupled to the processing core, the L1 cache comprising an L1 cache entry, an L2 cache, inclusive with respect to the L1 cache, the L2 cache comprising an L2 cache corresponding to the L1 cache entry, an activity flag associated with the L2 cache entry, the activity flag indicating an activity status of the L1 cache entry, and an L2 cache controller to manage the L2 cache, wherein, in response to detecting a read operation of a data item stored at the L1 cache entry, the L2 cache controller is to set the flag to an active status.

In Example 12, the subject matter of Example 11 can further comprise an L1 cache controller to manage the L1 cache, wherein the L1 cache controller, in response to detecting the read operation, store, in the L1 cache entry, an address of the L2 cache entry in the L2 cache.

In Example 13, the subject matter of any of Examples 11 and 12 can optionally provide that the L1 cache controller is further to, in response to detecting an eviction operation with respect to the L1 cache entry, determine that a status of the L1 cache entry is clean, determine the address of the L2 cache entry in the L2 cache, and set the flag of the L2 cache entry to an inactive status using the address via a communication channel between the L1 cache controller and the L2 cache controller.

In Example 14, the subject matter of any of Examples 11 and 12 can optionally provide that the processing core is further to, in response to receiving a request to select for eviction a victim L2 cache entry, identify a plurality of L2 cache entries associated with activity flags indicating the inactive status, select, in accordance with a cache replacement policy, the victim L2 cache entry from the plurality of L2 cache entries, and evict the victim L2 cache entry.

In Example 15, the subject matter of Example 14 can optionally provide that the replacement policy is a least-recently used (LRU) replacement policy.

In Example 16, the subject matter of Example 11 can optionally provide that the L2 cache entry comprises a flag field to store a value of the flag.

Example 17 is a method including receiving, by a processing core, a request to select for eviction a victim L2 cache entry of an L2 cache, wherein the L2 cache is inclusive with respect to an L1 cache associated with the processing device, identifying a plurality of L2 cache entries that are associated with activity flags indicating that a corresponding L1 cache entry is inactive, selecting, in accordance with a cache replacement policy, the victim L2 cache entry from the plurality of L2 cache entries, and evicting the victim L2 cache entry.

In Example 18, the subject matter of Example 17 can optionally provide that the replacement policy is a least-recently used (LRU) replacement policy.

In Example 19, the subject matter of Example 17 can optionally provide that each L2 cache entry comprises a flag field to store a value of a flag.

In Example 20, the subject matter of any of Examples 17 and 18 can optionally provide that a cache controller, operatively coupled to the processing core, is to set the flag to an inactive status in response to evicting the corresponding L1 cache entry.

Example 21 is an apparatus including means for performing the subject matter of any of Examples of 17 and 18.

Example 22 is a machine-readable non-transitory medium having stored thereon program codes that, when executed, perform operations including receiving, by a processing core, a request to select for eviction a victim L2 cache entry of an L2 cache, wherein the L2 cache is inclusive with respect to an L1 cache associated with the processing device, identifying a plurality of L2 cache entries that are associated with activity flags indicating that a corresponding L1 cache entry is inactive, selecting, in accordance with a cache replacement policy, the victim L2 cache entry from the plurality of L2 cache entries, and evicting the victim L2 cache entry.

In Example 23, the subject matter of Example 22 can optionally provide that the replacement policy is a least-recently used (LRU) replacement policy.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:

a processing core;

an L1 cache, operatively coupled to the processing core, the L1 cache comprising an L1 cache entry to store a data item;

an L2 cache, inclusive with respect to the L1 cache, the L2 cache comprising an L2 cache entry corresponding to the L1 cache entry;

a register to store an activity flag associated with the L2 cache entry, the activity flag indicating whether the L1 cache entry is associate with an active status or an inactive status; and a cache controller to, in response to detecting an access operation with respect to the L1 cache entry, set the activity flag to the active status; and in response to detecting an eviction operation with respect to the L1 cache entry and determining that the data item stored in the L1 cache entry has not been modified, reset the activity flag to an inactive status.

2. The processor of claim 1, wherein in response to detecting the eviction operation and determining that the data item stored in the L1 cache entry has not been modified, the cache controller is further to:

clear the activity flag to the inactive status via a communication channel from the L1 cache entry to the L2 cache entry.

3. The processor of claim 1, wherein the processing core is further to, in response to receiving a request to select for eviction a victim L2 cache entry, identify a plurality of L2 cache entries associated with activity flags indicating the inactive status; and select, in accordance with a cache replacement policy, the victim L2 cache entry from the plurality of L2 cache entries.

4. The processor of claim 2, wherein the processing core is further to evict the victim L2 cache entry.

5. The processor of claim 2, wherein the replacement policy is a least-recently used (LRU) replacement policy.

6. The processor of claim 1, wherein the L2 cache entry of the L2 cache stores the data item stored in the L1 cache entry of the L1 cache.

7. The processor of claim 1, wherein the register is operatively coupled to the cache controller to store a value of the activity flag.

8. The processor of claim 6, wherein the register comprises a plurality of bits to store values of a plurality of activity flags associated with a plurality of L2 cache entries in the L2 cache.

9. The processor of claim 1, wherein the L2 cache entry comprises a flag field to store a value of the activity flag.

10. A system comprising:

a processing core;

an L1 cache, operatively coupled to the processing core, the L1 cache comprising an L1 cache entry;

an L2 cache, inclusive with respect to the L1 cache, the L2 cache comprising an L2 cache corresponding to the L1 cache entry;

a register to store an activity flag associated with the L2 cache entry, the activity flag indicating whether the L1 cache entry is associate with one of an active status or an inactive status;

an L2 cache controller to manage the L2 cache, wherein, in response to detecting a read operation of a data item stored at the L1 cache entry, the L2 cache controller is to set the activity flag to the active status; and an L1 cache controller to:

in response to detecting an eviction operation with respect to the L1 cache entry; and in response to detecting an eviction operation with respect to the L1 cache entry, determine that a status of the L1 cache entry is clean;

determine the address of the L2 cache entry in the L2 cache; and set the activity flag of the L2 cache entry to the inactive status using the address.

11. The system of claim 10, wherein the L1 cache controller is further to, in response to detecting the eviction operation with respect to the L1 cache entry, set the activity flag of the L2 cache entry to the inactive status using the address via a communication channel between the L1 cache controller and the L2 cache controller.

12. The system of claim 10, wherein the processing core is further to, in response to receiving a request to select for eviction a victim L2 cache entry, identify a plurality of L2 cache entries associated with activity flags indicating the inactive status;

select, in accordance with a cache replacement policy, the victim L2 cache entry from the plurality of L2 cache entries; and evict the victim L2 cache entry.

13. The system of claim 12, wherein the replacement policy is a least-recently used (LRU) replacement policy.

14. The system of claim 10, wherein the L2 cache entry comprises a flag field to store a value of the activity flag.

15. A method comprising:

receiving, by a processing core, a request to select for eviction a victim L2 cache entry of an L2 cache, wherein the L2 cache is inclusive with respect to an L1 cache associated with the processing device;

identifying a plurality of L2 cache entries that are associated with activity flags indicating that a corresponding L1 cache entry is associated with an inactive status, wherein each one of the activity flags is stored in a register and is associated with one of an active status or the inactive status;

selecting, in accordance with a cache replacement policy, the victim L2 cache entry from the plurality of L2 cache entries;

evicting the victim L2 cache entry;

in response to detecting an eviction operation with respect to the L1 cache entry and determining that the data item stored in the L1 cache entry has not been modified, resetting an activity flag associated with the L2 cache entry to an inactive status.

16. The method of claim 15, wherein the replacement policy is a least-recently used (LRU) replacement policy.

17. The method of claim 15, wherein each L2 cache entry comprises a flag field to store a value of the activity flag.

* * * * *